United States Patent
Peters, II (10) Patent No.: US 7,835,820 B2
(45) Date of Patent: Nov. 16, 2010

(54) SYSTEM AND METHOD FOR IMAGE MAPPING AND VISUAL ATTENTION

(75) Inventor: Richard A. Peters, II, Nashville, TN (US)

(73) Assignee: Vanderbilt University, Nashville, TN (US)

( * ) Notice: Subject to any disclaimer, the term of this patent is extended or adjusted under 35 U.S.C. 154(b) by 959 days.

(21) Appl. No.: 11/546,867

(22) Filed: Oct. 11, 2006

(65) Prior Publication Data

US 2009/0254236 A1 Oct. 8, 2009

Related U.S. Application Data (60) Provisional application No. 60/726,033, filed on Oct. 11, 2005.

(51) Int. Cl.
G06F 19/00 (2006.01)
(52) U.S. Cl. .................................................. 700/245
(58) Field of Classification Search ................. 700/245, 700/246, 250, 253, 254, 258; 701/1, 24, 701/25, 36, 213; 706/45, 903
See application file for complete search history.

(56) References Cited

U.S. PATENT DOCUMENTS

| | | | |
|---|---|---|---|
| 5,341,540 A | 8/1994 | Soupert et al. | |
| 5,548,511 A | 8/1996 | Bancroft | |
| 5,995,884 A | 11/1999 | Allen et al. | |
| 6,697,707 B2 | 2/2004 | Peters, II | |
| 6,937,210 B1 * | 8/2005 | MacDonald | 345/1.1 |
| 2002/0169733 A1 * | 11/2002 | Peters, II | 706/45 |
| 2005/0149227 A1 | 7/2005 | Peters et al. | |
| 2005/0223176 A1 | 10/2005 | Peters et al. | |

FOREIGN PATENT DOCUMENTS

WO 02/081156 A2 10/2002

OTHER PUBLICATIONS

Mataric, Maja J., et al., *A Distributed Model for Mobile Robot Environment-Learning and Navigation*, Artificial Intelligence Laboratory of the Massachusetts Institute of Technology, Technical Report 1228, May 1990.

Pfeifer, R., et al., *Sensory-Motor Coordination: the Metaphor and Beyond*, Robotics and Autonomous Systems, Special Issue on Practice and Future Agents, vol. 20, No. 2-4, 1997, pp. 157-178.

Albus, J.S., *Outline for a Theory of Intelligence*, IEEE Trans. Syst. Man, and Cybern., vol. 21, No. 3, 1991.

(Continued)

*Primary Examiner*—Kim T Nguyen
(74) *Attorney, Agent, or Firm*—Morgan, Lewis & Bockius LLP (57) ABSTRACT

A method is described for mapping dense sensory data to a Sensory Ego Sphere (SES). Methods are also described for finding and ranking areas of interest in the images that form a complete visual scene on an SES. Further, attentional processing of image data is best done by performing attentional processing on individual full-size images from the image sequence, mapping each attentional location to the nearest node, and then summing attentional locations at each node.

5 Claims, 8 Drawing Sheets

OTHER PUBLICATIONS

Peters, R. A. II, et al., *The Sensory Ego-Sphere as a Short-Term Memory for Humanoids*, Proc. IEEE-RAS Int'l Conf. on Humanoid Robots, pp. 451-459, Waseda University, Tokyo, Japan, Nov. 22-24, 2001.

Pfeifer, R., et al., *Understanding Intelligence*, (MIT Press, 1999). pp. 382-497.

Hambuchen, K.A., *Multi-Modal Attention and Event Binding in Humanoid Robots Using a Sensory Ego-Sphere*, Ph.D. Dissertation, Vanderbilt University, 2004.

Peters, R.A. II, et al., *The Sensory Ego-Sphere: A Mediating Interface Between Sensors and Cognition*, Auton Robot (2009) 26: pp. 1-19.

K.R. Cave, *The FeatureGate Model of Visual Selection*, Psychological Research, 62, 182-194 (1999).

Shapiro, L., et al., *Computer Vision*, Prentice Hall 2001, pp. 163-167.

Pratt, W.K., *Digital Image Processing*, Wiley-Interscience Publication, 3d Ed., 2001, pp. 454-455.

Achim, K., *Image Mapping and Visual Attention on a Sensory Ego-Sphere*, submitted to the Faculty of the Graduate School of Vanderbilt University in partial fulfillment of the requirements for the degree of Master of Science in Electrical Engineer, Aug. 2005, Nashville, Tennessee, pp. 1-6.

Achim, K., *Image Mapping and Visual Attention on a Sensory Ego-Sphere*, submitted to the Faculty of the Graduate School of Vanderbilt University in partial fulfillment of the requirements for the degree of Master of Science in Electrical Engineer, Aug. 2005, Nashville, Tennessee, pp. 7-30.

Achim, K., *Image Mapping and Visual Attention on a Sensory Ego-Sphere*, submitted to the Faculty of the Graduate School of Vanderbilt University in partial fulfillment of the requirements for the degree of Master of Science in Electrical Engineer, Aug. 2005, Nashville, Tennessee, pp. 30-39.

Achim, K., *Image Mapping and Visual Attention on a Sensory Ego-Sphere*, submitted to the Faculty of the Graduate School of Vanderbilt University in partial fulfillment of the requirements for the degree of Master of Science in Electrical Engineer, Aug. 2005, Nashville, Tennessee, pp. 40-62.

Achim, K., *Image Mapping and Visual Attention on a Sensory Ego-Sphere*, submitted to the Faculty of the Graduate School of Vanderbilt University in partial fulfillment of the requirements for the degree of Master of Science in Electrical Engineer, Aug. 2005, Nashville, Tennessee, pp. 63-88.

Achim, K., *Image Mapping and Visual Attention on a Sensory Ego-Sphere*, submitted to the Faculty of the Graduate School of Vanderbilt University in partial fulfillment of the requirements for the degree of Master of Science in Electrical Engineer, Aug. 2005, Nashville, Tennessee, pp. 89-92.

Peters, R.A., II, *Robot Behavior Acquisition Phase II: Sequencing and Compositing of Behaviors Learned through Teleoperation*, Final Report for NASA Grant NNJ04HI19G, Oct. 5, 2005.

Flemming, K.A., et al., *Image Mapping and Visual Attention on a Sensory Ego-Sphere*, 2006 IEEE, pp. 241-246.

Dodd, W., *The Design of Procedural, Semantic, and Episodic Memory Systems for a Cognitive Robot*, Master's Thesis, Master of Science, Electrical Engineering, Vanderbilt University, Aug. 9, 2005.

Gordon, S.M., *Cognitive Map Generation for Localization and Navigation from 3-D Laser Scan Images*, Master's Thesis, Master of Science, Electrical Engineering, Vanderbilt University, Mar. 31, 2005.

Fleming, P.A., *Implementing a Robust 3-Dimensional Egocentric Navigation System*, Master's Thesis, Master of Science, Electrical Engineering, Vanderbilt University, Jul. 21, 2005.

Communication from the European Patent Office in Application No. 06816851.7-1225/1934870, dated Jun. 9, 2010.

* cited by examiner

Related Art

Fig. 1

Related Art

SYSTEM AND METHOD FOR IMAGE MAPPING AND VISUAL ATTENTION

CROSS REFERENCE TO RELATED APPLICATIONS

This application claims benefit from U.S. provisional application Ser. No. 60/726,033, filed on Oct. 11, 2005, which is incorporated herein by reference.

A related patent is U.S. Pat. No. 6,697,707 for Architecture for Robot Intelligence which is incorporated herein by reference.

STATEMENT REGARDING FEDERALLY SPONSORED RESEARCH

This invention was made in part with support from the Government through NASA Grant NNJ04HI19G. The Government has certain rights in the invention.

FIELD OF THE INVENTION

The present invention relates to the field of intelligent machines. More specifically, the present invention relates to the field of adaptive autonomous robots.

BACKGROUND OF THE INVENTION

An autonomous robot is a robot that is capable of operating completely on its own by considering its situation in its environment and deciding what actions to take in order to achieve its goals without human intervention. A robot is adaptive if it is capable of improving its ability to achieve its goals.

An adaptive autonomous robot must be capable of sensing and interacting with its environment. Therefore, a robot must include sensors and actuators. A sensor is any device capable of generating a signal that can be mapped to a characteristic of the environment. A sensor may be a proprioceptive sensor that measures an internal aspect of the robot such as, for example, the angle formed by two members at a joint or the angular speed of a motor shaft. A sensor may be an exteroceptive sensor that measures an aspect external to the robot such as, for example, the intensity of light from a direction or the presence of a force applied to the robot. An actuator is any device enabling the robot, in whole or in part, to perform an action. The physical state of the robot may be described by an (S+A)-dimensional state vector, R(t), where S is the dimensionality of the robot's sensor data and A is the dimensionality of the robot's actuator controllers. The state vector, R(t), is the only information accessible to the robot. In addition to sensors, actuators, and mechanical support structures, a robot must have one or more computers capable of receiving signals from the sensors, transmitting commands to the actuators, and executing one or more programs.

The task of building an adaptive autonomous robot is sufficiently complex that research groups have partitioned the problem into several more manageable tasks and have concentrated on solving each task independently of the others. Three tasks or behaviors are considered to be the most difficult in robotics; learning, planning, and world representation.

Initial efforts to implement these behaviors in robots were concentrated on building a complex program that processed environmental information from sensors and generated commands to actuators resulting in behaviors that resembled learning, planning, and abstraction (in order to represent the robot's world, or surroundings) in humans.

Although efforts to build a single, complex control program continue, many of the new and exciting advancements in robotics are based upon the rejection of the notion that complex behavior requires a complex control program. Instead, control is distributed to many interacting autonomous agents. Agents are small programs that act independently of other agents while interacting with the other agents. Complex behavior, such as learning or abstraction, emerge from the interaction of many independent agents rather than being controlled by any one agent.

Mataric and Brooks, "Learning a Distributed Map Representation Based on Navigation Behaviors," in "Cambrian Intelligence: the early history of the new AI," The MIT Press, 1999, demonstrated that complex behaviors, such as goal-directed navigation, could emerge from the interaction of simpler behaviors termed "reflexes." A reflex is an agent that couples an actuator signal to a sensor signal. For example, an avoid reflex may generate a signal to a wheel motor based on a signal from a proximity sensor. If the proximity sensor senses an object within a danger zone of the robot, the reflex generates a signal to stop the wheel motor. Mataric and Brooks showed that starting with only four reflexes, goal-directed navigation could emerge from their interaction. The reflexes, however, were not generated by the robot but required hand-coding by a programmer.

Pfeifer, R. and C. Scheier, "Sensory-motor coordination: the metaphor and beyond," Robotics and Autonomous Systems, Special Issue on "Practice and Future of Autonomous Agents," vol. 20, No. 2-4, pp. 157-178, 1997 showed that signals from the sensors and actuators tended to cluster for repeated tasks and termed such clustering category formation via Sensory Motor Coordination ("SMC"). Cohen has shown that robots can partition the continuous data stream received from sensors into episodes that can be compared to other episodes and clustered to form an exemplar episode. An exemplar episode is representative of the cluster of several episodes and may be determined by averaging over the episodes comprising each cluster. The exemplar episode is self-generated (by the robot) and replaces the external programmer. As the robot is trained, the robot will identify a set of exemplar episodes that may be used to complete an assigned task. The ability of the robot to identify episodes from a continuous sensor data stream and to create "categories" (exemplar episodes) from the clustered episodes may be considered to be a rudimentary form of robotic learning.

In order to gather a sufficient number of episodes for the identification of categories, the robot must be trained. Training is normally accomplished by a reinforcement learning ("RL") technique as will be known to those skilled in the art. In one example of RL, the robot is allowed to randomly generate actions while a trainer rewards actions that move the robot toward a desired goal. The rewards reinforce the most recent actions of the robot and over time, episodes corresponding to the rewarded actions will begin to cluster as similar actions are rewarded similarly. The training, however, requires many repetitions for each action comprising the desired task.

An autonomous robot must be able to select an action that will lead to or accomplish its desired goal. One known method for robot planning involves a spreading activation network ("SAN"), a set of competency modules ("CM") that, when linked together, initiate a sequence of commands that the robot may perform to accomplish the desired goal. A competency module includes information characterizing the state of the robot both before (state pre-conditions) and after (state post-conditions) a command to an actuator. Competency modules are linked by matching the state pre-conditions of one CM to the state post-conditions of another CM.

Planning begins by first identifying all terminal CMs, defined as CMs having state post-conditions corresponding to the state of the robot after accomplishment of the assigned goal. The state pre-conditions of each of the terminal CMs are then used to find other CMs having state post-conditions matching the state pre-conditions of the terminal CMs. The process is repeated until the state pre-conditions of a CM correspond to the present state conditions of the robot.

In one method of searching for the shortest path to a goal, each CM is assigned an activation value determined by CMs in contact (matching endpoints) with the CM. The order of execution is determined by the activation value of each CM where the CM with the largest activation value is executed next.

As the number of CMs increases, the time required to complete the search increases very rapidly and the reaction time of the robot increases until the robot is unable to respond to the dynamic changes in its environment. While such a search may be acceptable for planning before beginning a task, the exponential increase of the search time as more CMs are added (i.e. as the robot learns) renders such a search unsuitable for real-time response to the robot's changing environment.

The back-propagation of CM linking creates an unavoidable delay in the robot's responsiveness because the robot cannot begin to execute the linked CMs until the complete chain of CMs taking the robot from its present state to the goal state are found. This unavoidable delay limits the operating environments of the robots to situations that are usually predictable.

Therefore there remains a need for an efficient method for robotic planning capable of reacting to sudden or dynamic situations in the robot's environment while allowing for the addition of CMs as the robot learns.

In robots, as well as humans, the amount of sensory information received greatly exceeds the processing capability of the robot. In order to function in any environment, a robot must be able to condense the voluminous sensor data stream to a data rate that its processors can handle while retaining information critical to the robot's operation. In one method of condensing the sensor data stream, the robot builds a representation of the robot's environment (the world model) and compares the received sensory information to the representation stored by the robot. The world model allows the robot to orient itself in its environment and allows for rapid characterization of the sensory data to objects in the world model.

The world model may be allocentric or may be ego-centric. An allocentric world model places objects in a coordinate grid that does not change with the robot's position. An ego-centric model is always centered on the present position of the robot. One example of an ego-centric model is described in Albus, J. S., "Outline for a theory of intelligence", IEEE Trans. Syst. Man, and Cybern., vol. 21, no. 3, 1991. Albus describes an Ego-Sphere wherein the robot's environment is projected onto a spherical surface centered on the robot's current position. The Ego-Sphere is a dense representation of the world in the sense that all sensory information is projected onto the Ego-Sphere. Albus' Ego-Sphere is also continuous because the projection is affine. The advantage of the Ego-Sphere is its complete representation of the world and its ability to account for the direction of an object. The Ego-Sphere, however, still requires processing of the sensory data stream into objects and a filtering mechanism to distinguish important objects from unimportant objects. Furthermore, Albus does not disclose or suggest any method for using the Ego-Sphere to develop an action plan for the robot, nor is there a suggestion to link the Ego-Sphere to the learning mechanism of the robot.

Another example of an ego-centric model is the Sensory Ego Sphere (SES) described in U.S. Pat. No. 6,697,707 which is incorporated by reference herein. Again, the robot's environment is projected onto a spherical surface centered on the robot's current position. More particularly, in one embodiment, the SES is structured as a geodesic dome, which is a quasi-uniform triangular tessellation of a sphere into a polyhedron. A geodesic dome is composed of twelve pentagons and a variable number of hexagons that depend on the frequency (or tessellation) of the dome. The frequency is determined by the number of vertices that connect the center of one pentagon to the center of another pentagon, all pentagons being distributed on the dome evenly. Illustratively, the SES has a tessellation of 14 and, therefore, 1963 nodes.

The SES facilitates the detection of events in the environment that simultaneously stimulate multiple sensors. Each sensor on the robot sends information to one or more sensory processing modules (SPMs) designed to extract specific information from the data stream associated with that sensor. The SPMs are independent of each other and run continuously and concurrently on preferably different processors. Each SPM sends information messages to an SES manager agent which stores the data, including directional sensory information if available, in the SES. In particular, sensory data is stored on the sphere at the node closest to the origin of the data (in space). For example, an object that has been visually located in the environment is projected onto the sphere at azimuthal and elevation angles that correspond to the pan and tilt angles of the camera-head when the object was seen. A label that identifies the object and other relevant information is stored into a database. The vertex on the sphere closest to an object's projection becomes the registration node, or the location where the information is stored in the database. Each message received by the SES manager is also given a time stamp indicating the time at which the message was received.

The SES eliminates the necessity of processing the entire spherical projection field to find items of interest. Processing the entire projection field is very time consuming and decreases the robot's ability to respond quickly to dynamic changes in its environment. Significant events are quickly identified by the SES by identifying the most active areas of the SES. Processing resources are only used to identify objects at the most active areas and are not wasted on uninteresting or irrelevant areas of the projection field. Furthermore, the SES is able to fuse or associate independent sensor information written to the same vertex at little additional cost (in terms of computing resources) because each SPM writes to the SES independently of each other.

In one embodiment, the vertices of the SES are distributed uniformly over the spherical surface such that nearest-neighbor distances for each vertex are roughly the same. Discretization of the continuous spherical surface into a set of vertices enables the SES agents to quickly associate independent SPM information based on the direction of each sensor source. The selection of the size of the SES (the number of vertices) may be determined by one of skill in the art by balancing the increased time delay caused by the larger number of vertices against the highest angular resolution of the robot's sensors. In a preferred embodiment, the vertices are arranged to match the vertices in a geodesic dome structure.

Figure 1:
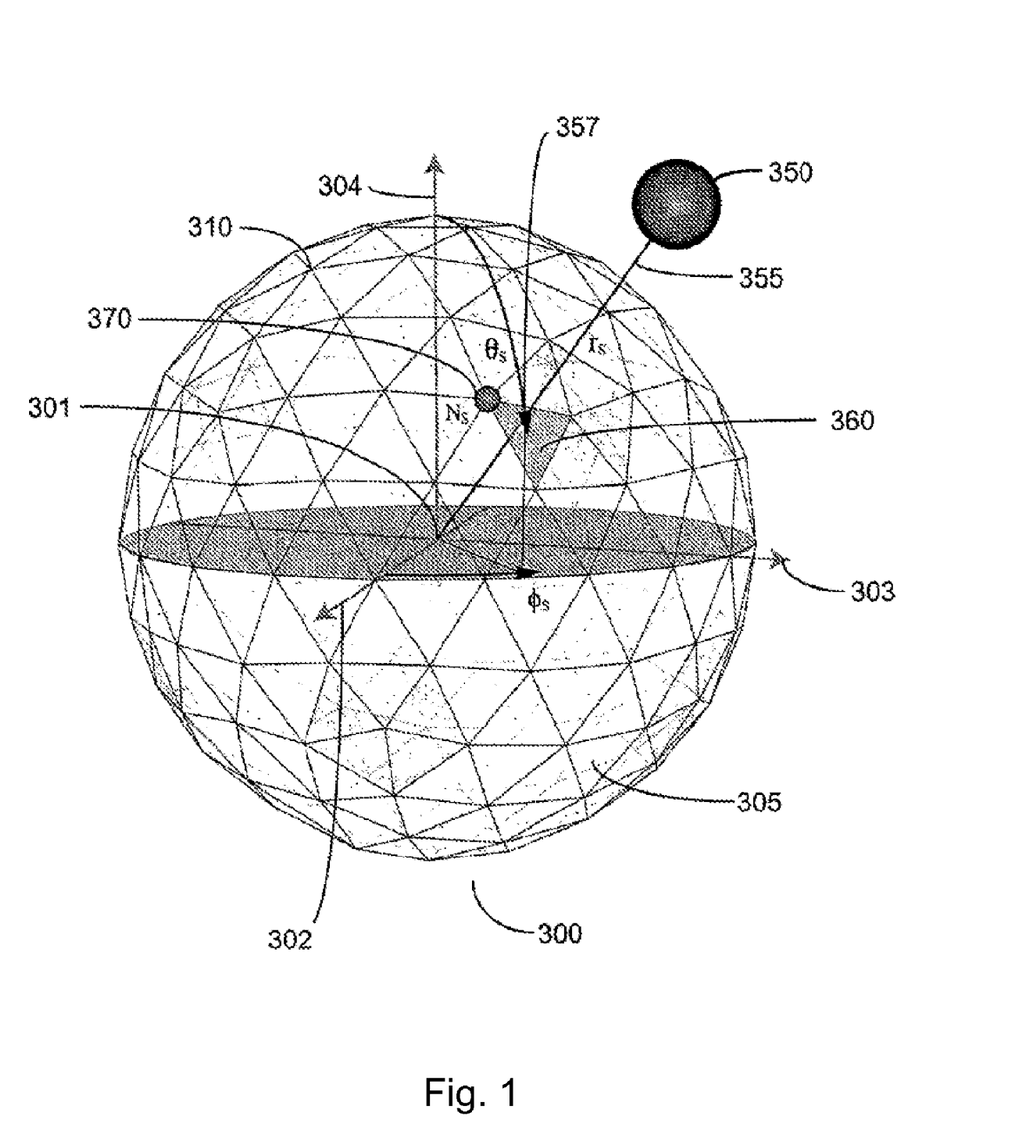
FIG. 1 is an illustrative diagram useful in understanding a Sensory Ego-Sphere.

FIG. 1 is an illustrative diagram of the SES reproduced from FIG. 3 of the '707 patent. In FIG. 1, the SES is represented as a polyhedron 300. The polyhedron 300 comprises planar triangular faces 305 with a vertex 310 defining one corner of the face. In the polyhedron of FIG. 1, each vertex has either five or six nearest-neighbor vertices and nearest-neighbor distances are substantially the same although tessellations producing a range of nearest-neighbor distances are also within the scope of the present invention. The SES is centered on the current location of the robot, which is located at the center 301 of the polyhedron. Axis 302 defines the current heading of the robot, axis 304 defines the vertical direction with respect to the robot, and axis 303, along with axis 302 define the horizontal plane of the robot.

An object 350 is projected onto the SES by a ray 355 connecting the center 301 to the object 350. Ray 355 intersects a face 360 at a point 357 defined by azimuthal angle, $\phi_s$, and elevation (or polar) angle, $\theta_s$. Information about the object 350, such as $\phi_s$ and $\theta_s$ are stored at the vertex 370 that is closest to point 357.

In one embodiment, the SES is implemented as a multiply-linked list of pointers to data structures each representing a vertex on the tessellated sphere. Each vertex record contains pointers to the nearest-neighbor vertices and an additional pointer to a tagged-format data structure (TFDS). The TFDS is a terminated list of objects; each object consisting of an alphanumeric tag, a time stamp, and a pointer to a data object. The tag identifies the sensory data type and the time stamp indicates when the data was written to the SES. The data object contains the sensory data and any function specifications such as links to other agents associated with the data object. The type and number of tags that may be written to any vertex is unrestricted.

The SES may be implemented as a database using standard database products such as Microsoft Access.RTM. or MySQL.RTM. An agent to manage communications between the database and other system components may be written in any of the programming languages, such as Basic or C++, known to one of skill in the art.

In one embodiment, the database is a single table that holds all registered information. The manager communicates with other agents in the control system and relays the requests generated to the database. The manager can receive one of four types of requests from any agent: post data, retrieve data using data name, retrieve data using data type and retrieve data using location. The post function takes all relevant data from the requesting agent and registers these data in the database at the correct vertex location. Relevant data includes data name, data type and the tessellation frequency at which the data should be registered. The vertex angles are determined by the SES according to the pan (or azimuthal) and tilt (or elevation) angles at which the data was found. Also, a time stamp is registered with the relevant data. The retrieve data using data name function queries the database using the specified name. This query returns all records in the database that contain the given name. All data is returned to the requesting agent. The retrieve data using data type function is like the previous function, but the query uses the data type instead of name. The retrieve data using location function determines the vertices to query from using the specified location and the neighborhood depth in which to search. When all vertices are determined, the query is placed and all records at the specified vertices are returned.

In another embodiment, the database consists of two tables wherein a vertex table holds the vertex angles and their indices and a data table holds all registered data. When the SES is created, the manager creates the vertices for the projection interface. Each vertex in the vertex table holds an azimuthal angle, an elevation angle, and indices uniquely identifying each vertex. The manager communicates with outside agents of the control system and relays the requests generated to the database. The manager can receive one of four requests from any agent: post data, retrieve data using data name, retrieve data using data type and retrieve data using location. The post function takes all relevant data from the requesting agent and registers this data in the database at the correct vertex location. The retrieve data using data name function queries the database using the specified name. This query returns all records in the database that contain the given name. All data is returned to the requesting agent. The retrieve data using data type function is similar to the retrieve data using data name function but the query uses the data type instead of name. The retrieve data using location function uses the indices and angles stored in the vertex table. The desired location specified in the request is converted into a vertex on the SES. The indices for this vertex are located, and all indices falling within the desired neighborhood of the initial location are collected. The angles matching these indices are then used in a query to the main database holding registered data. All information at these locations is returned to the requesting component.

In addition to post and retrieve agents, other agents may perform functions such as data analysis or data display on the information stored in the SES through the use of the post and retrieve agents.

As each SPM agent writes to a vertex on the SES, an attention agent searches through the vertex list to find the most active vertex, referred to as the focus vertex. High activity at a vertex, or a group of vertices, is a very rapid method of focusing the robot to an event in the environment that may be relevant to the robot without processing the information in all the vertices of the SES first. In one embodiment of the present invention, the attention agent identifies the focus vertex by finding the vertex with the highest number of SPM messages.

In a preferred embodiment, the attention agent weights the information written to the SES, determines an activation value of each message based, in part, on the currently executing behavior, and identifies the focus vertex as the vertex with the highest activation value. If the currently executing behavior terminates normally (the post-condition state is satisfied), the attention agent should expect to see the post-condition state and can sensitize portions of the SES to the occurrence of the post-condition state such that SPM data written to the sensitized portion of the SES are given a greater weight or activity. Each SPM may also be biased, based on the currently executing behavior from a database associative memory (DBAM), to give more weight to expected SPM signals.

For example, a currently executing behavior may have a post-condition state that expects to see a red object 45° to the left of the current heading. The attention agent would sensitize the vertices in the region surrounding the 45° left of current heading such that any SPM data written to those vertices are assigned an activity that is, for example, 50% higher than activities at the other vertices. Similarly, the SPM that detects red objects in the environment would write messages having an activity level that is, for example, 50% greater than the activity levels of other SPMs.

An event in the environment might stimulate several sensors simultaneously, but the messages from the various SPMs will be written to the SES at different times because of the varying delays (latencies) associated with each particular sensor. For example, Finding a moving edge in an image sequence will take longer than detecting motion with an IR sensor array. A coincidence detection agent may be trained to account for the varying sensor delays using training techniques known to one of skill in the art such that messages received by the SES within an interval of time are identified as responses to a single event.

In addition to the SPM data written to a vertex, a vertex may also contain links to behaviors stored in the DBAM. Landmark mapping agents may also write to the SES, storing a pointer to an object descriptor at the vertex where the object is expected. Objects may be tracked during robot movement on the SES using transformations such as those described in Peters, R. A. II, K. E. Hambuchen, K. Kawamura, and D. M. Wilkes, "The Sensory Ego-Sphere as a Short-Term Memory for Humanoids", Proc. IEEE-RAS Int'l. Conf. on Humanoid Robots, pp. 451-459, Waseda University, Tokyo, Japan, Nov. 22-24, 2001 herein incorporated by reference in its entirety.

The ability to place an expected object onto the SES and to track objects enables the robot to know what to expect and to remember and recall where objects it has passed should be. The ability to recall passed objects also enables the robot to backtrack to a previous state if a sudden event causes the robot to "get lost" in the sense that a sudden event may displace the state of the robot to a point far from the robot's active map prior to the event.

The ability to place an object onto the SES provides the robot the capability for ego-centric navigation. The placement of three objects on the SES allows the robot to triangulate its current position and the capability of placing the goal state on the SES allows the robot to calculate the goal with respect to its current position.

The objects placed in the SES may also originate from sources external to the robot such as, for example, from another robot. This allows the robot to "know" the location of objects it cannot directly view.

The information written to the focus vertex is vector encoded to a current state vector and passed to the DBAM. The current state vector is used in the DBAM to terminate or continue the currently executing behavior and to activate the succeeding behavior.

Actuator controls are activated by executing behavior agents retrieved from the DBAM. Each behavior is stored as a record in the DBAM and is executed by an independent behavior agent. When the robot is operating in an autonomous mode and performing a task, the currently executing behavior agent receives information from the SES. The currently executing behavior agent either continues executing the current behavior if the SES information corresponds to the state expected by the current behavior or terminates the current behavior if the SES information corresponds to the post-condition state of the current behavior. The currently executing behavior may also be terminated by a simple time-out criteria.

Upon identifying a termination condition, the succeeding behavior is selected by propagation of activation signals between the behaviors linked to the currently executing behavior. Restricting the search space to only the behaviors that are linked to the currently executing behavior, instead of all of the behaviors in the DBAM, significantly reduces the search time for the succeeding behavior such that real-time responsiveness is exhibited by the robot.

Each of the behaviors linked to the current behavior computes the vector-space distance between the current state and its own pre-condition state. Each behavior propagates an inhibitory signal (by adding a negative number to the activation term) that is inversely proportional to the computed distance to the other linked behaviors. The propagation of the inhibitory signal between the linked behaviors has the effect that, in most instances, the behavior with the highest activation term is also the behavior whose pre-condition state most closely matches the current state of the robot.

The links between behaviors are created by the SAN agent during task planning but may also be created by a dream agent during the dream state. The links are task dependent and different behaviors may be linked together depending on the assigned goal.

When the robot is tasked to achieve a goal, the spreading activation network (SAN) agent constructs a sequence of behaviors that will take the robot from its current state to the goal state (active map) in the DBAM by back-propagating from the goal state to the current state. For each behavior added to the active map, the SAN agent performs a search for behaviors that have a pre-condition state close to the post-condition state of the added behavior and adds a link connecting the close behavior to the added behavior. An activation term characterizing the link and based on the inverse vector space distance between the linked behaviors is also added to the added behavior. The SAN agent may create several paths connecting the current state to the goal state.

A command context agent enables the robot to receive a goal defined task and to transition the robot between active mode, dream mode, and training mode.

During periods of mechanical inactivity when not performing or learning a task or when the current task does not use the full processing capabilities of the robot, the robot may transition to a dream state. While in the dream state, the robot modifies or creates new behaviors based on its most recent activities and creates new scenarios (behavior sequences never before executed by the robot) for possible execution during future activity.

Each time the robot dreams, the dream agent analyzes R(t) for the recent active period since the last dream state by identifying episode boundaries and episodes. Each recent episode is first compared to existing behaviors in the DBAM to confirm if the recent episode is another instance of the existing behavior. The comparison may be based on the average distance or end-point distances between the recent episode and the existing behavior or any other like criteria. If the episode is close to the behavior, the behavior may be modified to account for the new episode.

If the episode is distinct from the existing behaviors, the dream agent creates a new behavior based on the episode and finds and creates links to the nearest behaviors. The default activation link to the nearest existing behaviors may be based, in part, on the number of episodes represented in the exemplar behavior such that a new behavior generated from a single episode may be assigned a smaller activation value than behaviors generated from many episodes. The new behavior is added to the DBAM for possible future execution.

If a robot is limited to behavior sequences learned only through teleoperation or other known training techniques, the robot may not be able to respond to a new situation. In a preferred embodiment, a dream agent is activated during periods of mechanical inactivity and creates new plausible behavior sequences that may allow the robot, during its active state, to react purposefully and positively to contingencies never before experienced. The dream agent randomly selects a pairs of behaviors from the DBAM and computes the end-point distances between the selected behaviors. The endpoint distances are the distances between the pre-condition state of one behavior and the post-condition state of the other behavior. The distance may be a vector distance or any appropriate measure known to one of skill in the art. If the computed distance is less than a cut-off distance, the preceding behavior (the behavior with the post-condition state close to the succeeding behavior's pre-condition state) is modified to include a link to the succeeding behavior.

The robots of Pfeifer and Cohen must be trained to identify episodes that lead to the accomplishment of a task. The training usually involves an external handler that observes and rewards robot behaviors that advance the robot through the completion of the task. The robot either makes a random move or a best estimate move and receives positive or negative feedback from the handler depending on whether the move advances the robot toward the goal. This move-feedback cycle must be repeated for each step toward the goal. The advantage of such a training program is that robot learns both actions that lead toward a goal and actions that do not accomplish a goal. The disadvantage of such a system is that the training time is very long because in addition to learning how to accomplish a task, the robot learns many more methods of not accomplishing a task.

A more efficient method of learning a task is to teach the robot only the tasks required to accomplish a goal. Instead of allowing the robot to make random moves, the robot is guided through the completion of the task by an external handler via teleoperation. During teleoperation, the handler controls all actions of the robot while the robot records the state (sensor and actuator information) of the robot during the teleoperation. The task is repeated several times under slightly different conditions to allow the formation of episode clusters for later analysis. After one or more training trials, the robot is placed in the dream state where the recorded state information is analyzed by the robot to identify episodes, episode boundaries, and to create exemplar episodes for each episode cluster.

SUMMARY OF INVENTION

Thus far, the SES has been a sparsely populated map able to track the position of known objects in the vicinity of the robot. It has been constrained by limited resolution and limited ability to rapidly process the sensory information it receives. The present invention alleviates these problems.

First, a method is described for mapping dense sensory data to an SES. Second, methods are described for finding and ranking areas of interest in the images that form a complete visual scene on the SES. Further, I have found that attentional processing of image data is best done by performing attentional processing on individual full-size images from the image sequence, mapping each attentional location to the nearest node, and then summing all attentional locations at each node. More information is available through this method since attentional processing is repeatedly done on each image in the sequence. An attentional point that has persisted in several adjacent images will have a higher activation value and, therefore, will be deemed more salient than an attentional point found in only one image. Therefore, the confidence that a location deemed salient by this method is an actual salient feature is greater than with alternative processing methods in which attentional processing is performed only once on the image reconstructed from the foveal windows posted on the SES.

BRIEF DESCRIPTION OF THE FIGURES

These and other objects, features and advantages of the present invention may be understood more fully by reference to the following detailed description in which.

DETAILED DESCRIPTION

Figure 2:
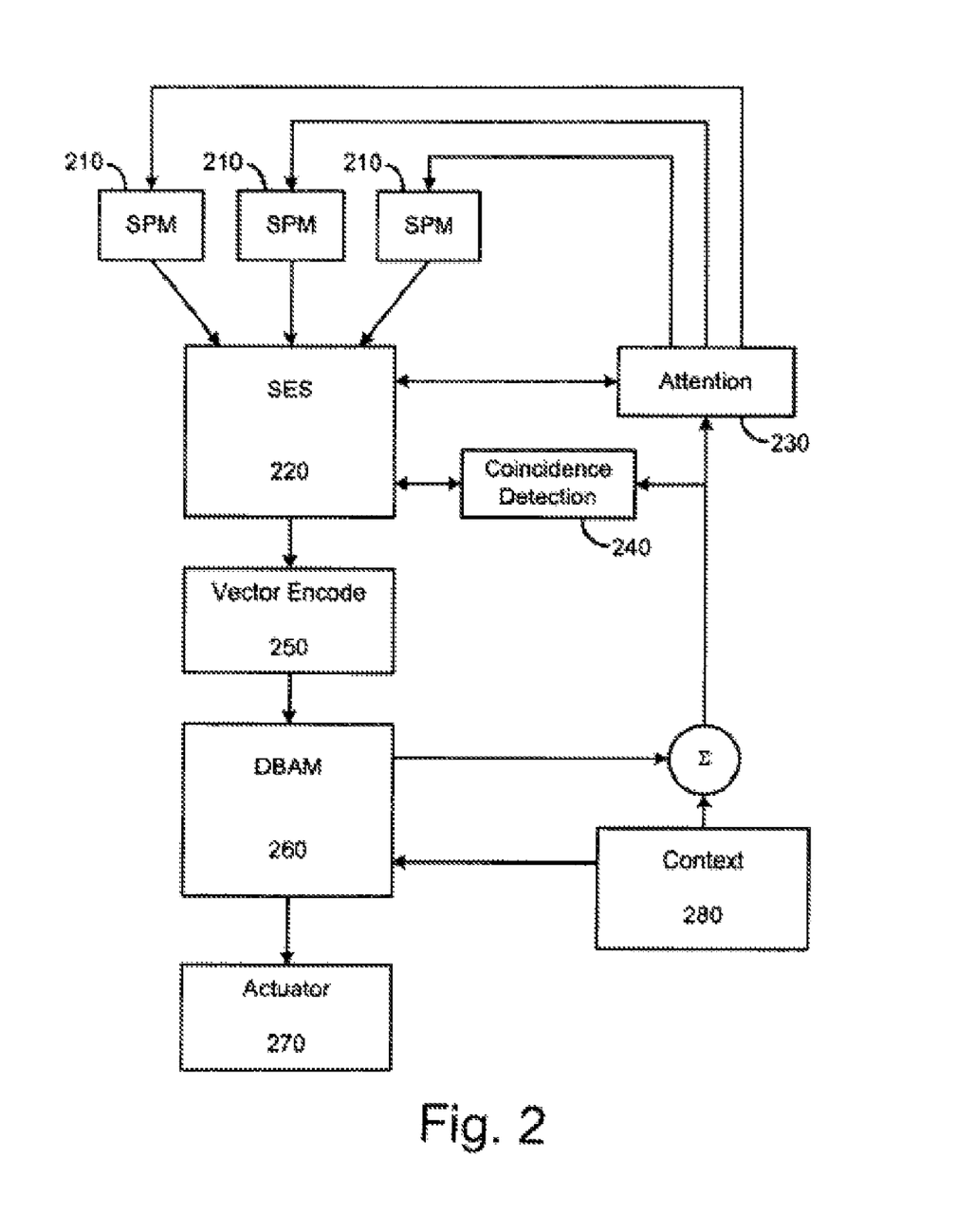
FIG. 2 is a schematic diagram showing the system architecture of an illustrative embodiment of a prior art adaptive autonomous robot.

FIG. 2 is a schematic diagram showing the system architecture of one embodiment of the invention of the '707 patent. In FIG. 2, a sensory processing module (SPM) 210 provides information about the robot's environment to a Sensory Ego Sphere (SES) 220. The SES 220 functions as the short term memory of the robot and determines the current state of the robot from the information provided by the SPM 210 and determines a focus region based on the information provided by the SPMs 210, an attention agent 230, and a coincidence agent 240. A vector encoding agent 250 retrieves the data associated with the focus region from the SES 220 and maps the data to a state space region in a database associative memory (DBAM) 260.

If the robot is in an active mode, such as performing a task, the DBAM 260 activates a Spreading Activation Network (SAN) to plan a series of actions, also referred to as an active map, for the robot to perform in order to achieve the assigned goal. Each action is executed as a behavior stored in the DBAM 260, the DBAM functioning much like a long term memory for the robot. The appropriate behavior according to the active map is retrieved from the DBAM 260 and executed by an actuator 270. The actuator 270 includes controls to control an actuator on the robot that causes the robot to act on the environment through the actuator. The DBAM also provides the robot's current state information to the attention agent 230 and coincidence agent 240.

A context agent 280 provides information relating to the operating context of the robot received from a source external to the robot. In a preferred embodiment, the context agent 280 provides for three general operating contexts; tasking, training, and dreaming. In the tasking context, the context agent 280 sets the task goal as received from the external source. In the training context, the context agent 280 may route all teleoperation commands received from the external source through the DBAM to the actuators. In the dreaming context, the context agent 280 may disable the actuators and activate the DBAM to modify and create behaviors based on the robot's most recent activities maintained by the SES 220.

Each SPM 210 is comprised of one or more agents acting independently of each other and are now described in detail.

Each SPM 210 is associated with a sensor and writes sensor specific information to the SES 220. The robot's sensors may be internal or external sensors. Internal sensors measure the state or change-in-state of devices internal to the robot. Internal sensors include joint position encoders, force-torque sensors, strain gauges, temperature sensors, friction sensors, vibration sensors, inertial guidance or vestibular sensors such as gyroscopes or accelerometers, electrical sensors for current, voltage, resistance, capacitance or inductance, motor state sensors such as tachometers, clocks or other time meters, or other transducers known to one of skill in the art. These sensors could also be informational measuring, for example, the status of computational modules, the activities of computational agents or the communications patterns between them. The success or failure of tasks can be "sensed" informationally to add to an internal affect measurement.

External sensors are energy transducers. They are stimulated by energy incident from outside of the robot and convert the incident energy into an internal (to the robot) energy source (electrical, mechanical, gravitational, or chemical) that can be either sampled and quantized by the robot for abstract representation or used directly to feed other sensors or to drive actuators. External sensors include still image, motion picture (video) cameras either color or monochrome, infrared, optical, ultraviolet or multi-spectral, non-imaging light sensors sensitive to various wavelengths, microphones, active range finders such as SONAR, RADAR, or LIDAR, proximity sensors, motion detectors, haptic arrays such as, for example, touch sensors in artificial skin, thermometers, singly or in arrays, contact sensors (feelers), bump sensors, olfactory or chemical sensors, vibration sensors, global positioning system (GPS) sensors, magnetic field sensors (including compasses), electrical field sensors, and radiation sensors. External sensors may also be informational receiving communications signals (radio, TV, data), having direct internet connections, or connections to other robots. External sensors may have computational aspects that interpret speech, gestures, facial expressions, tone and inflection of voice.

Each sensor may be associated with one or more SPMs and each SPM may process one or more sensors. For example, an SPM may process the signals from two microphone sensors to determine the direction of an auditory source. In another example, a camera may send its signal to a SPM that only identifies a strong edge in a visual field and the same signal to another SPM that only identifies the color red in the visual field.

Each actuator 270 includes an actuator control that controls an actuator on the robot. Actuators may be any device that causes the robot to act on its environment or change the relative orientation of any of the robot's parts. Actuators perform work and may be driven by any conceivable energy source such as electrical, pneumatic, hydraulic, thermal, mechanical, atomic, chemical, or gravitational sources. Actuators include motors, pistons, valves, screws, levers, artificial muscles, or the like as known to one of skill in the art. Generally, actuators are used for locomotion, manipulation, or active positioning or scanning of sensors. Actuators may refer to groups of actuators performing a coordinated task such as arm or leg movement, or in active vision systems.

Actuator controls are normally activated by the robot's behavior agents that execute a sequence of behaviors during a task. During training, actuator controls may be activated by a handler external to the robot in a process that is referred to as teleoperation.

One of the major unsolved problems in robotics is precisely how to combine sensory information of different modalities so that signals are correctly attributed to objects in the environment. Moreover, Sensory-Motor Coordination (SMC) is necessary for animals and robots to act purposefully. It may also be fundamental for categorization. Pfeifer has shown that SMC data-recorded during simultaneous action and sensing by a robot that is executing a fixed set of tasks in a simple but changing environment-can self-organize into descriptors that categorize the robot-environment interaction. Pfeifer, R., Scheier C., *Understanding Intelligence* (MIT Press, 1999). As a robot operates, SMC requires multimodal sensory information to be associated with motor activity, which, in turn, requires sensor binding despite different spatio-temporal resolutions and differing temporal latencies in throughput. Since resources (sensory, computational, motor) can only be directed toward a small subset of environmental features available at any one time, learning SMC also requires attention.

The Sensory Ego Sphere (SES) has been proposed as a computational structure that supports both SMC and attention. Hambuchen, K. A., "Multi-Modal Attention and Event Binding in Humanoid Robots Using a Sensory Ego-Sphere", Ph.D. Dissertation, Vanderbilt University, 2004. The egocentric, spherical mapping of SES's locale acts as an interface between sensing and cognition. Peters, R. A. II, Hambuchen, K. A., Bodenheimer, R. E., "The Sensory Ego-Sphere: A Mediating Interface Between Sensors and Cognition". Submitted to *IEEE Transactions on Systems, Man and Cybernetics*, September, 2005. The SES has been used to keep track of the position of known objects in the vicinity of a robot. Peters, R. A. II, Hambuchen, K. A., Kawamura, K., Wilkes, D. M. "The Sensory Ego-Sphere as a Short-Term Memory for Humanoids". *Proceedings of the IEEE-RAS Conference on Humanoid Robots*, 2001, pp. 451-60. With the independent, parallel SPMs, the SES binds coincident sensory data as a consequence of its geometric structure. Id. It can also combine attentional events detected by different sensors with task- and environment-specific context to produce a ranked set of critical areas in the environment. Hambuchen, K. A., Ph.D. Dissertation. Thus, it is able to combine attentional signals to direct the focus of attention. It is also capable of sensitization and habituation with respect to attention. Id.

As used previously, the SES is a sparsely populated map. The present invention provides a method for mapping of high-resolution sensory information (in the form of visual imagery) onto an SES. It also addresses the problems of finding and ranking areas of interest in the images that form a complete visual scene on the SES.

In practicing the invention, a set of 320×240 color images was taken by a humanoid robot's rotating pan/tilt camera-head. The images were not preprocessed and no particular objects were identified. The camera-head was caused to traverse its workspace while grabbing images. The result was a complete mapping of the visual scene onto the SES. Since the cameras cannot rotate through 360 degrees and cannot, therefore, map the entire SES, a connected subset of the SES within the area of +20 to −60 degrees in tilt and +80 to −80 degrees in pan was populated. This range was chosen both because cameras can cover it and because the ±80' pan range is consistent with the human field of view.

Figure 3:
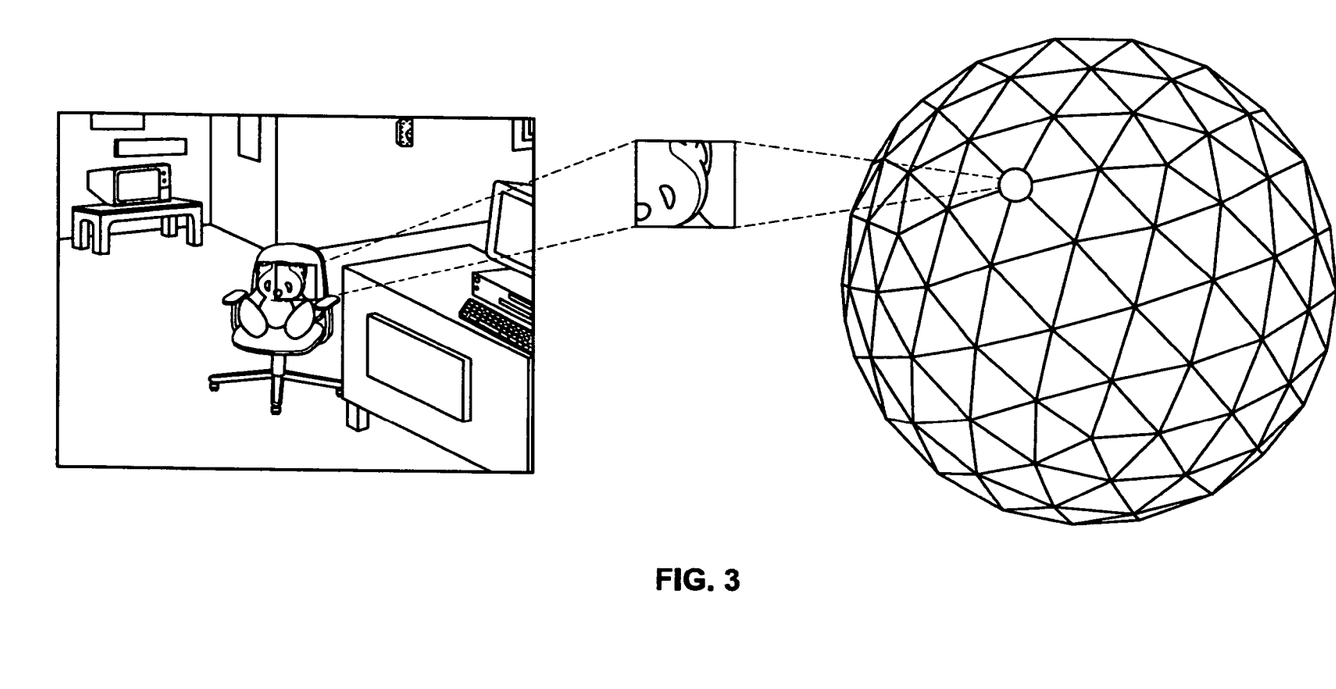
FIG. 3 is a diagram depicting the image formation process used in practicing an embodiment of the invention.

The task of mapping a complete visual scene onto the Sensory Ego Sphere was accomplished by first compiling a list of all the SES nodes within the field of view. A sequence of 519 images was then generated by taking a picture at each of the pan/tilt locations corresponding to a node in the list; more precisely, the image center corresponded to that angle pair. A foveal window at the center of each image in the sequence was extracted and posted on the SES at the correct node location. FIG. 3 illustrates this procedure as carried out to form an image at node 1422 of the SES with pan and tilt angles of −33.563 and −23.466, respectively.

Figure 4:
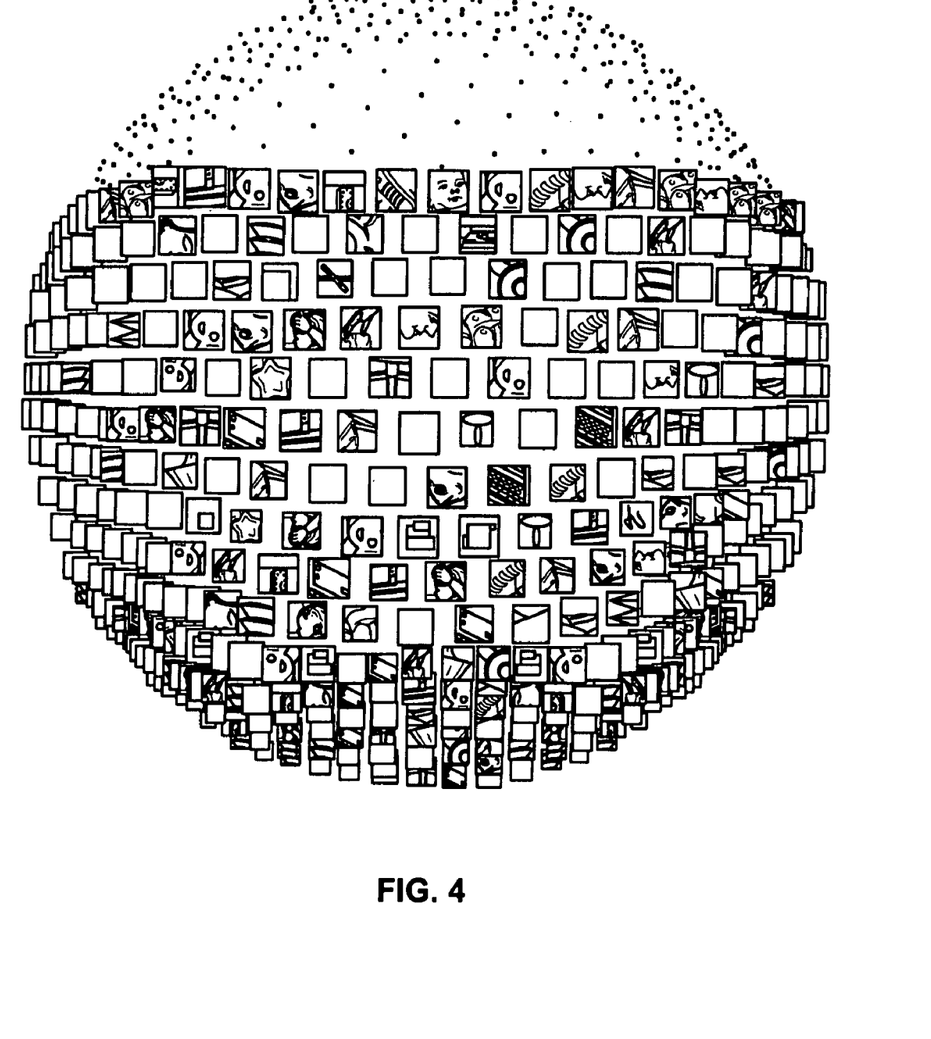
FIG. 4 depicts a set of foveal images posted on the SES.

The size of the foveal window taken from the center varied but was generally approximately 5° in pan and 5° in tilt since this is the distance that separates most nodes on a geodesic dome with a frequency of 14. However, because both pentagons and hexagons make up the dome, edges between nodes on a geodesic dome do not all have the same length. For precise results, the distances between each node and its four closest neighbors (top, down, left, and right) were calculated in degrees and converted to pixel measures. The pixel-per-degree measure was determined experimentally. An appropriately-sized fovea was then extracted from the center of the image. Each fovea record was posted onto the SES at the node corresponding to its pan/tilt angle pair. FIG. 4 shows a visual representation of all the foveal images posted on the Sensory Ego Sphere with respect to a humanoid robot.

Figure 5:
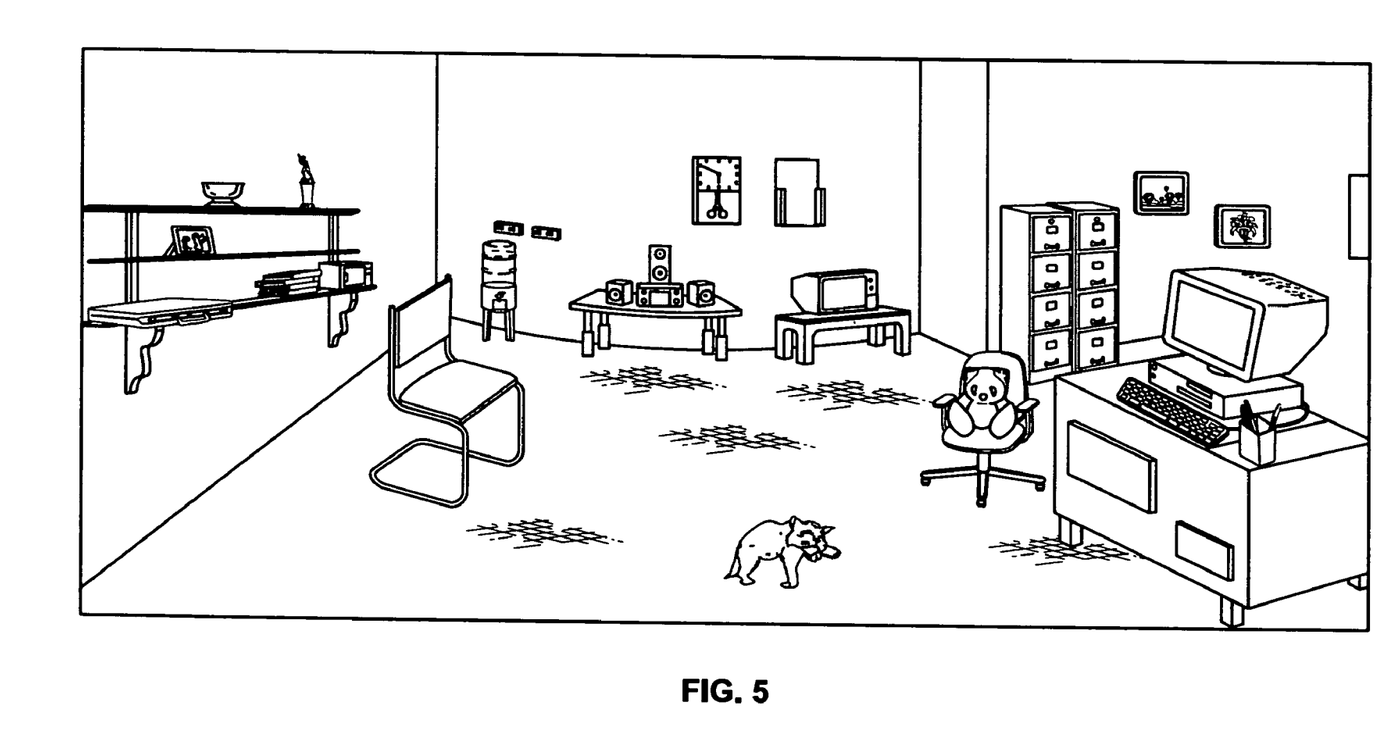
FIG. 5 is a scene reconstructed from the foveal images.

A piecewise continuous image of the visual scene was reconstructed from all foveal images posted on the SES. A node map that associates each pixel in the reconstructed image with a node on the SES was also generated. A reconstructed image is illustrated in FIG. 5.

The problem of attention arises once the SES is populated with dense information. Because of limited computational resources, only regions of interest-determined by safety, opportunity, and by the task—can be attended to, if the robot is to interact with a human-centered environment in real time. The problem lies in how to perform attention processing given a populated SES and an image input stream. There are at least two possibilities. One is to perform visual attention processing on the entire SES. The other is to detect points of interest within the individual images and combine them with the imagery that is already present.

One model of visual attention is the Feature Gate model. This model is based on Cave's observations that attention seems to inhibit objects in the scene based on both their locations and their similarity to the target. K. R. Cave, "The FeatureGate Model of Visual Selection," *Psychological Research,* 62, 182-194 (1999) which is incorporated herein by reference. In this model, each location in the visual scene has a vector of basic features, such as orientation or color, as well as an attentional gate that regulates the flow of information from the location to the output. The gate limits the flow of information from its location when that information would potentially interfere with information from another location that is more promising or more important for current processing goals. Thus, the gated flow depends on that location's features and the features of surrounding locations. The visual scene is partitioned into neighborhoods. The features in groups of neighborhoods are scored and compared; and the "winning" location in each group of neighborhoods is passed to the next level. This proceeds iteratively until there is only one location remaining, the output of the model. FeatureGate contains two subsystems to handle bottom-up and top-down attentional mechanisms. A top-down process is task-related. For example, the task may be to search for a particular person in a scene. In this case, locations with known features of the target person are favored over locations without such features. In particular, the similarity of locations to the target is scored and those locations that are most similar are favored over all the others. A bottom-up process identifies the most salient location in the scene independent of the task. In this case, locations having features that differ from the features at surrounding locations are favored. In particular, numerical saliency values are computed for the most prominent features and the locations of these features are favored over other features.

In the present invention, FeatureGate was implemented for this research using three separate feature maps: one each for color. luminance, and orientation. The orientation processing is implemented by a Frei-Chen basis. Shapiro, L., Stockman, G. C., *Computer Vision* (Prentice Hall 2001); Pratt, W. K., *Digital Image Processing,* p. 454 (Wiley-Interscience, 3d Ed. 2001, which are incorporated herein by reference. For better results, the incoming images were first blurred using a constant filter. By blurring the image, FeatureGate processing is less susceptible to minuscule, insignificant changes that occur from one image to the next. In accordance with the bottom up process of the FeatureGate model, each pixel location's features were compared to the features of its 8 nearest neighbors by Euclidean distance and the results were added and saved in the activation map. If the top-down process were to be used, each pixel location's features would be compared to the known target features, and the locations with the highest activations from the first level would be selected as foci of attention. However, in experiments performed thus far, the top-down process was not used and attentional points were chosen solely on their salience and not by targeting specific feature characteristics.

In accordance with the invention, attentional processing was performed on each image in the image sequence using the FeatureGate methodology and the results were recorded at the node corresponding to the optical center of the image. In this processing, the 12 most salient locations (row and column location) and their activation values (or scores) in a saliency array structure were obtained. This array also included the pan and tilt angles of the image being processed. The number of locations returned by the program was set to 12 arbitrarily because it was found that this number usually results in a relatively uniform distribution of attentional points throughout the image.

Although only a subsection (the central foveal region) is displayed on the graphical SES representation, a full-size image is taken and processed at each node location. Because of this, there is considerable overlap between nodally-adjacent images from the sequence. The overlap means that attentional points from different images will often refer to the same location in space. In the vision system used for this work, a single image spans approximately 55° in pan and 45° in tilt. Therefore, if two images are less than 55° in pan and 45° in tilt apart, they will overlap. Since only a foveal window is associated with each node, images that lie within approximately 30° in pan and 25° in tilt will overlap in the fovea. This yields approximately 30 images that overlap any central foveal window. It was desired that there be one overall attentional salience value associated with each node of the SES. To compute a single salience value for a node, the salience of all attentional points that map to the node, whether from the image taken at that node location or from adjacent images, are combined. It was presumed that an attentional location that is identified in many images is more salient (and should, therefore, have a higher value) than an attentional location found in one image only. The process followed to combine attentional points and to identify scene locations of high salience is described below.

After attentional data is obtained from an image, each of its 12 salient points is mapped to the SES node that corresponds to its location. The correspondence is determined as follows: The distance in pixels of the image center from the attentional point is first calculated then converted into a displacement in degrees using pixel-per-degree values determined experimentally: a span of 5 degrees in tilt was approximately 28 pixels and a span of 5 degrees in pan was approximately 30 pixels.

Once that information is known, it is used in conjunction with the pan/tilt angle of the optical center to find each attentional point's actual pan and tilt angle so that the point can be mapped to the appropriate node. Errors in location can cause attentional points from the same feature to be mapped to adjacent nodes. Therefore, an attentional point clustering algorithm was used to find all attentional locations that correspond to a specific environment feature. The procedure was to select each node ID with at least 15 attentional points and calculate the median pan/tilt values of the points. All attentional points in all images that fell within a radius of 2 degrees from the median pan/tilt values were then found. All these points were mapped to the same node—the node with the most attentional points that fall within the radius. A radius of 2 degrees was chosen because it represents approximately one-quarter of the average fovea and is compact enough to isolate point clusters.

An example of this is illustrated in Table 1, which shows all original images (imgCtrID column) with an attentional point that maps to node 1421 (ID column) on the SES as well as each attentional point's calculated pan and tilt angles.

TABLE I

All Attentional Points That Map To Node 1422

| Img CtrID | Activation | Row | Col | ID | New pan | New tilt |
|---|---|---|---|---|---|---|
| 1302 | 3528.456 | 197 | 146 | 1421 | −38.769 | −26.631 |
| 1626 | 4406/089 | 47 | 212 | 1421 | −37.660 | −26.918 |
| 1624 | 3865.287 | 41 | 140 | 1421 | −39.610 | −25.835 |
| 1421 | 3819.206 | 137 | 161 | 1421 | −38.602 | −26.537 |
| 1682 | 4790.870 | 26 | 236 | 1421 | −37.308 | −27.323 |
| 1340 | 3567.101 | 173 | 134 | 1421 | −39.200 | −26.030 |
| 1424 | 4096.694 | 131 | 233 | 1421 | −36.692 | −27.320 |
| 1679 | 4030.104 | 17 | 116 | 1421 | −39.962 | −25.698 |
| 1501 | 4254.137 | 98 | 236 | 1421 | −36.789 | −27.576 |
| 1303 | 4170.348 | 197 | 173 | 1421 | −38.141 | −26,680 |
| 1733 | 4671.133 | 5 | 266 | 1421 | −37.252 | −27.576 |

Figure 6:
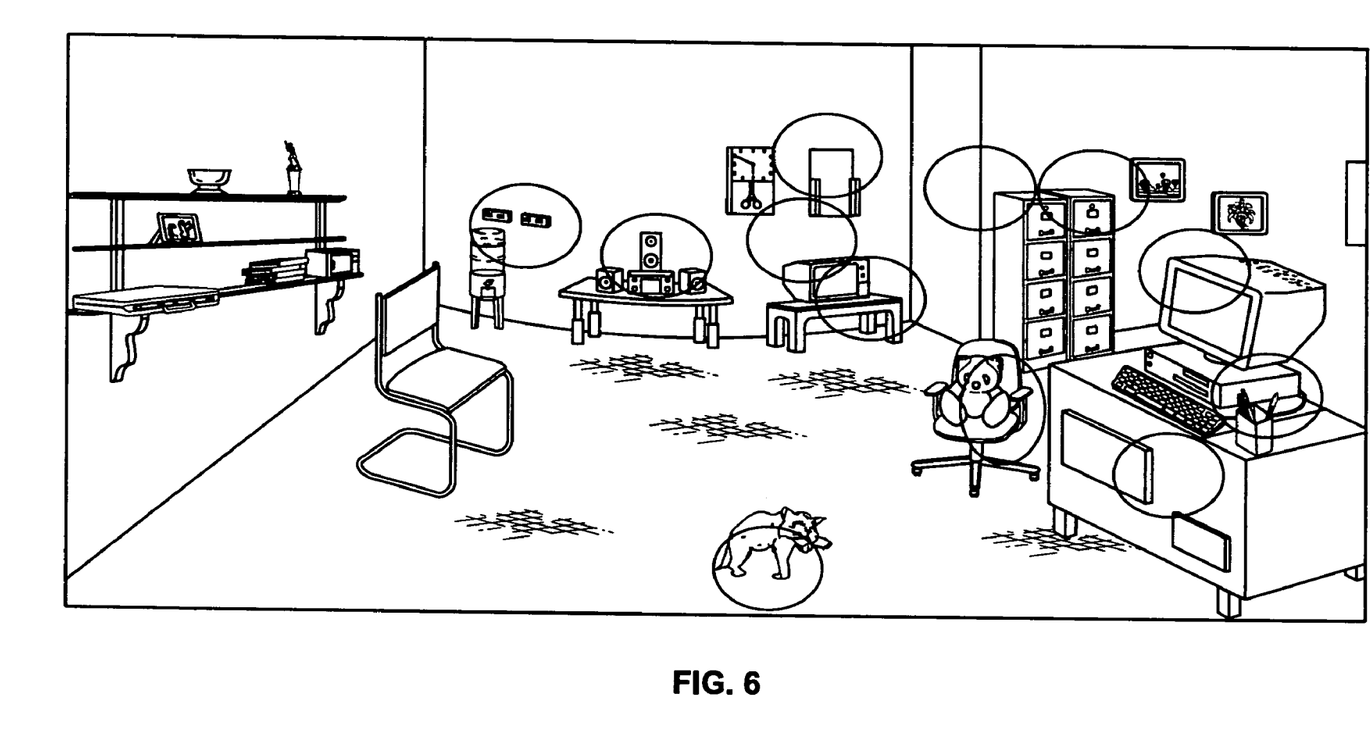
FIG. 6 identifies the 12 most salient locations in the scene as identified by summing the scenes in individual images in accordance with one embodiment of the invention.

To determine the saliencies of the nodes, the activation value (i.e., the numerical saliency value) of each attentional point posted at a node was summed. FIG. 6 shows the top 12 overall most salient locations in the scene.

Figure 7:
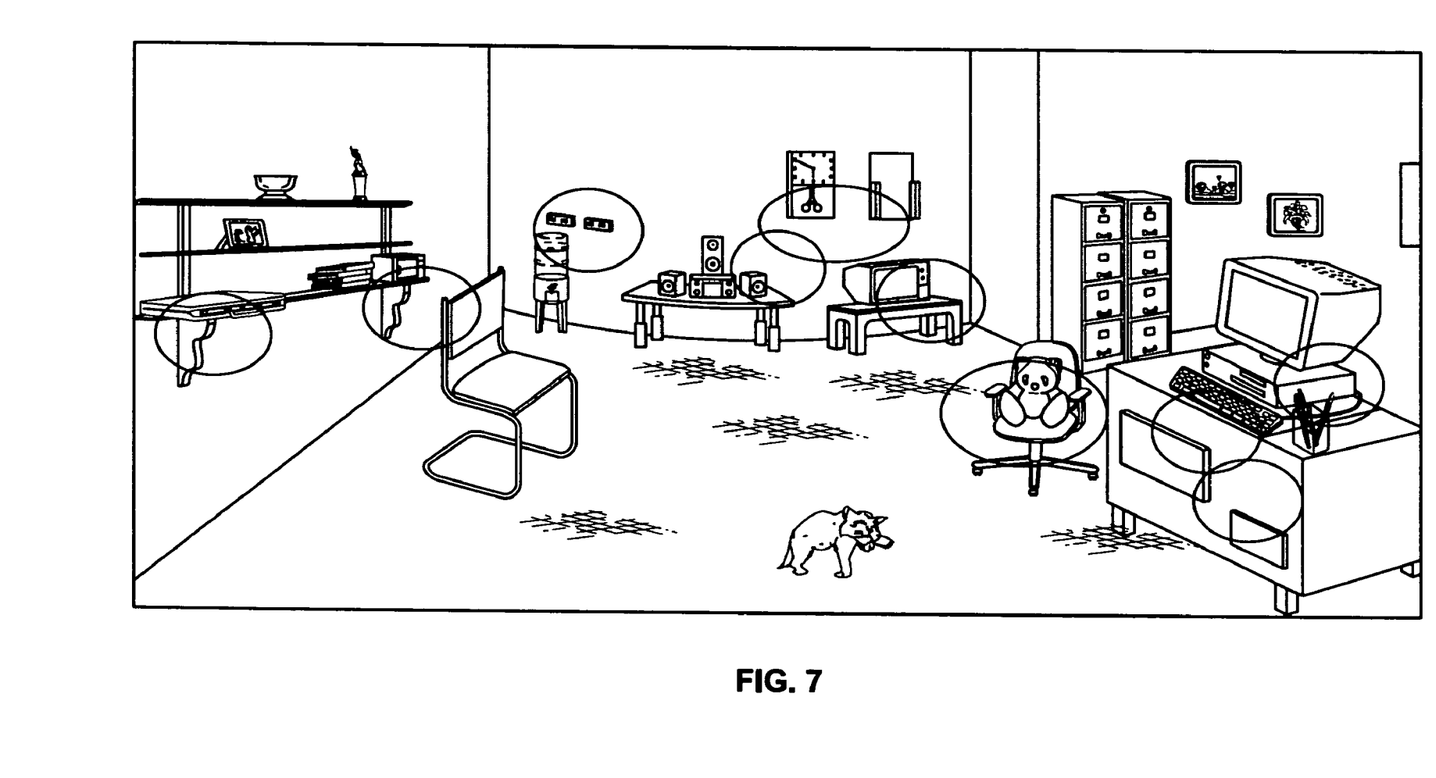
FIG. 7 identifies the 12 most salient locations in the scene as identified by processing the entire scene.

Another way to determine attentional locations on the entire SES would be to process the image of the visual scene (reconstructed from the foveal images as described above) through FeatureGate (for example, the image in FIG. 5). To do this, the FeatureGate algorithm was modified to include the node map of the reconstructed image. This makes it possible to record the node ID with which the attentional point is associated for comparison with the other attentional processing technique. The results can be found in FIG. 7.

Figure 8:
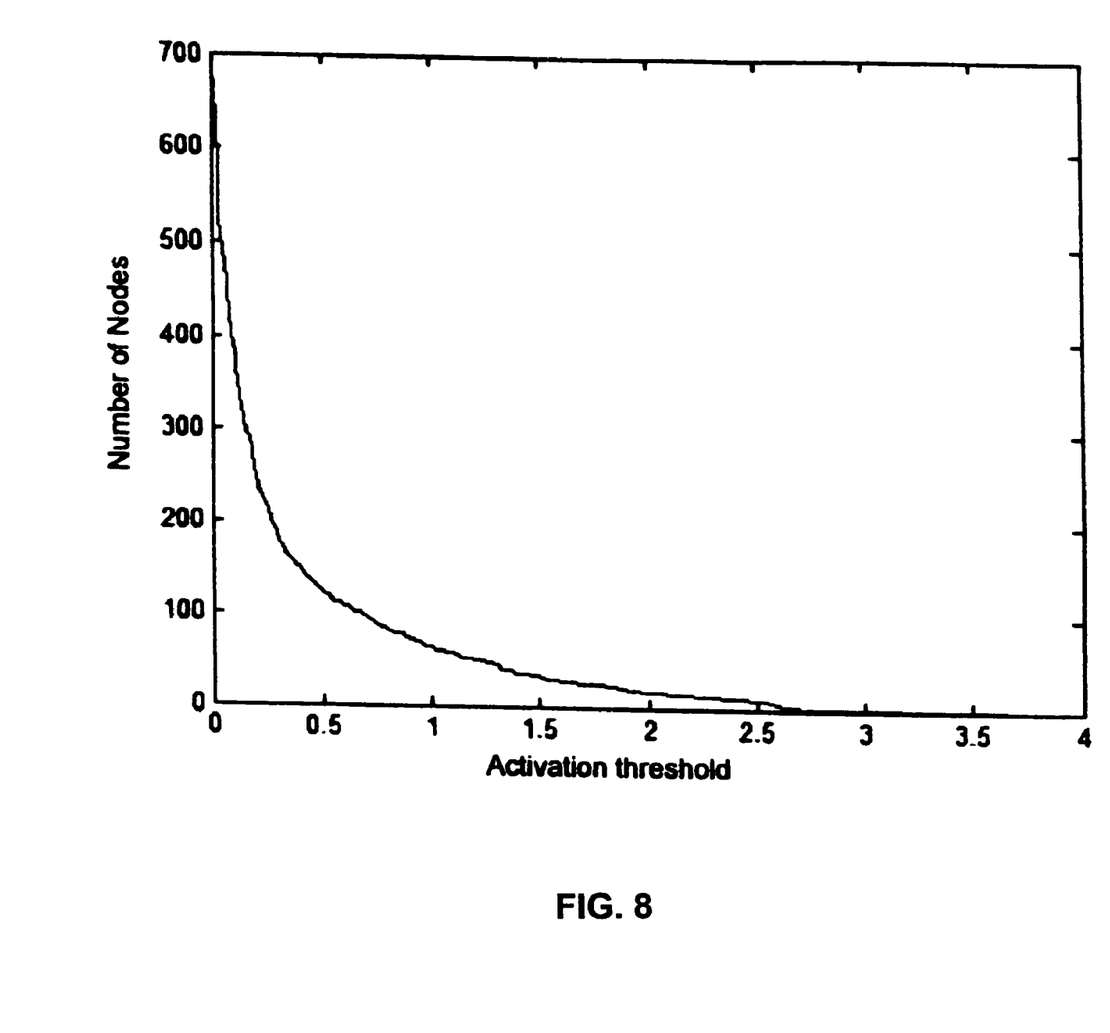
FIG. 8 is a graph depicting the number of nodes above a specific activation threshold.

FIG. 8 is a graph of activation threshold versus number of nodes. It represents the number of nodes above threshold for threshold values ranging from the minimum to the maximum summed activation values per node calculated in this experiment. There were 672 nodes with attentional locations.

Several thresholds were chosen and the percentage of nodes with activation above threshold level was computed. The first three columns of Table II list these results. They give a measure of the activation level necessary for a node to be a significant attentional location on the entire SES. For example, to be in the top 10% of attentional locations on the SES, a node would have to have a summed activation value of at least 100000.

Another way of determining how important a single attentional location is to the overall salience of the SES is to calculate the percentage of individual attentional locations that map to a node with above-threshold activation. There were a total of 6228 attention locations on the SES. These calculations were performed for several thresholds. For example, if the nodes with activation values in the top 10% are chosen (threshold of 100000), the percentage of individual attentional locations that map to one of these nodes is 41%. In other words, 41% of individual attentional locations map to the top 10% of node locations on the SES. The percentage calculations for different thresholds can be found in the last column of Table II.

TABLE II

| Activation Threshold | Number of Nodes above Threshold | Percentage of Nodes above Threshold | Percentage of Individual Attentional Locations at Nodes Above Threshold |
|---|---|---|---|
| 27000 | 201 | 30% | 77% |
| 45000 | 134 | 20% | 65.3% |
| 100000 | 64 | 10% | 41% |

Another measure of the importance of individual attentional locations is the percentage of attentional locations in the top N locations (nodes). This is similar to the percentage comparison above except that a fixed number of nodes are chosen, which can be useful for comparisons. Moreover, no matter how many attentional locations are found in a scene, only a fixed number can and should be attended. For example, 19% of individual attentional locations were found to map to the top 20 node locations on the SES. In order words, the 20 most salient locations on the sphere represent 19% of all individual attentional locations. Table III shows the number of attentional locations for several values of N.

TABLE III

| N | Percentage of attentional locations in top N node locations |
|---|---|
| 20 | 19% |
| 30 | 25.8% |
| 50 | 36.2% |

Attentional points found in individual images were compared to attentional points found over the entire reconstructed scene image. This was done by processing the reconstructed image (as the single image in FIG. 4) with FeatureGate to find the N nodes with highest activation. When attentional processing is performed on full-size individual images some attentional locations get mapped to nodes that do not correspond to an image piece posted in the SES. This occurs in images taken at nodes lying near the edges of the visual scene. These locations are not represented in the reconstructed visual scene image; to compare them to nodes in the reconstructed image would not be accurate. Therefore, the top N locations that correspond to a node in the reconstructed scene image were found. The attentional locations found through summation of the activation values were then compared to the locations found by processing the reconstructed scene image directly (Table IV).

TABLE IV

Attentional Nodes Matches in Individual Image Activation Summing and Reconstructed Scene Image

| N | Number/Percentage of matching nodes in top N locations |
|---|---|
| 12 | 5/42% |
| 20 | 8/40% |
| 30 | 13/43% |
| 50 | 21/42% |
| 100 | 59/59% |

Salient features, such as the panda, Barney doll, trash can, left side shelves, and chair were detected in both the summed activation image (paragraph 88) and the reconstructed scene image (paragraph 89). Features with definite edges and corners, such as the black frames on the front wall and the black wall-strip were also detected in both images.

The summed activation image (paragraph 88) appears better-suited for attention deployment on the SES. Processing the entire reconstructed scene image makes less information available than the summed activation image since only one image determines the most salient locations in the scene as opposed to a sequence of overlapping images. Moreover, updating the salience distribution on the SES as new information is made available is straightforward if the summed activation image is implemented. For example, this can be done simply by processing new images and combining the new attention points found with the attentional points already present. The activation at each node could be weighed by the age of each attentional point, giving more weight to newer points.

An experiment was performed to test the robustness of the summed activation image processing method. A subset of the original visual scene was selected and image sequences of that scene under different illumination levels were generated. The number of matching nodes between sequences with differing illumination can be found in table V. The low light and low spotlight illumination levels were very different from the high and medium light levels. This accounts for the low percentage of matching nodes. However, the percentage of matching nodes between the high light and medium light levels were high, which indicates that the system will behave similarly when faced with differing light levels.

TABLE V

Matching Nodes In The Top N Nodes Between Different Illumination Levels

| N | High light vs. Medium light | High light vs. Low light | High light vs Low spotlight | Medium light vs. Low light | Low light vs. Low spotlight |
|---|---|---|---|---|---|
| 12 | 11/92% | 6/50% | 3/25% | 7/58% | 5/42% |
| 20 | 16/80% | 10/50% | 8/40% | 11155% | 11/55% |
| 30 | 25/83% | 19/63% | 13/43% | 22/73% | 17/34% |
| 50 | 46/92% | 39/78% | 26/52% | 42/84% | 28/56% |
| 100 | 87/87% | 76/76% | 58/58% | 75/75% | 60/60% |

In summary, I have found that attentional processing of image data is best done by performing attentional processing on individual full-size images from the image sequence, mapping each attentional location to the nearest node, and then summing all attentional locations at each node. More information is available through this method since attentional processing is repeatedly done on each image in the sequence. An attentional point that has persisted in several adjacent images will have a higher activation value and, therefore, will be deemed more salient than an attentional point found in only one image. Therefore, the confidence that a location deemed salient by this method is an actual salient feature is greater than with the alternative processing methods in which attentional processing is performed only once on the image reconstructed from the foveal windows posted on the SES.

The invention described and claimed herein is not to be limited in scope by the preferred embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

A number of references are cited herein, the entire disclosures of which are incorporated herein, in their entirety, by reference for all purposes. Further, none of these references, regardless of how characterized above, is admitted as prior to the invention of the subject matter claimed herein.

What is claimed is:

1. An adaptive autonomous robot comprising:
sensors to generate signals that can be mapped to a characteristic of an environment surrounding the robot;
actuators to enable the robot to perform an action;
a camera for receiving image data from an external source;
a database for associating received image data with points on a portion of a spherical region centered on the robot;
means for performing attentional processing on individual images to identify attentional locations;
means for mapping each attentional location to a nearest point on the portion of the spherical region; and
a summer for summing activation values of the attentional locations mapped to a point.

2. The robot of claim 1 wherein the sensors comprise:
means for sensing an internal state of the robot; and
means for sensing one or more characteristics of the robot's environment.

3. The robot of claim 2 wherein the database comprises a sensory ego sphere for representing an object based on the sensed internal state and the sensed environment.

4. In an adaptive autonomous robot comprising:
sensors to generate signals that can be mapped to a characteristic of an environment surrounding the robot;
actuators to enable the robot to perform an action;
a camera for receiving image data from an external source; and
a database for associating received image data with points on a portion of a spherical region centered on the robot;
a method of finding and ranking areas of interest in images from the external source comprising:
performing attentional processing on individual images to identify attentional locations;
mapping each attentional location to a nearest point on the portion of the spherical region; and
summing activation values of the attentional locations mapped to a point.

5. An adaptive autonomous robot, comprising:
sensors to generate signals that can be mapped to a characteristic of an environment surrounding the robot;
actuators to enable the robot to perform an action;
a camera to receive image data from an external source;
a database to associate received image data with points on a portion of a spherical region centered on the robot;
an attention agent to perform attentional processing on individual images to identify attentional locations; and
a summer to sum activation values of the attentional locations mapped to a point wherein each attentional location is mapped to a nearest point on the portion of the spherical region.

* * * * *